United States Patent Office 3,394,988
Patented July 30, 1968

---

3,394,988
TREATMENT OF SPODUMENE
John H. Fishwick, West Chester, Pa., assignor to Foote Mineral Company, Exton, Pa., a corporation of Pennsylvania
No Drawing. Continuation-in-part of application Ser. No. 516,727, Dec. 27, 1965. This application Oct. 31, 1967, Ser. No. 679,503
14 Claims. (Cl. 23—110)

ABSTRACT OF THE DISCLOSURE

β-Spodumene which has been converted from α- to β-form at a temperature of from about 1850° F. to about 2100° F. is contacted with chlorine gas or hydrogen chloride at a temperature of at least 1750° F. to about 2100° F. until at least a major portion of the lattice-bound iron therein is removed.

---

This application is a continuation-in-part of application Ser. No. 516,727, filed Dec. 27, 1965.

The present invention relates to the treatment of spodumene; and, more particularly, the present invention relates to a process for removing lattice-bound iron from spodumene.

Spodumene is a naturally-occurring lithium aluminosilicate mineral widely used as a source of lithia in ceramics. This material normally contains a small amount of iron, and, as the result of crushing, flotation, magnetic separation and screening operations, the spodumene available commercially may have iron contents ranging from about 0.6% to about 2.5% (as $Fe_2O_3$). Although reported as $Fe_2O_3$, a portion of this iron contamination may be free iron introduced from grinding operations. However, a substantial portion of the iron contamination is present in solid solution in the spodumene lattice, possibly taking the place of an aluminum atom in the crystal structure.

Iron oxide is a particularly undesirable contaminant in glasses and in products made from glass (glass-ceramics). Even relatively small amounts of iron are often sufficient to impart an objectionable color to glass products or to products manufactured by way of the glassy state. As a result, wide utilization of spodumene as a source of lithia by the glass industry has not been realized.

To provide a spodumene material acceptable to the glass industry, the iron content would have to be substantially reduced. A reduction in iron from about 0.6% $Fe_2O_3$ or above to about 0.1% $Fe_2O_3$ or below would be considered very good and should lead to a product acceptable to the glass industry as far as iron contamination is concerned. Such a product would have a $Li_2O/Fe_2O_3$ weight ratio of about 70 or higher.

However, the removal of substantial iron from spodumene without destroying the spodumene's structure or without removing lithia has presented difficulties. The difficulties are believed to be due to the fact that the iron is combined in the spodumene lattice as stated above. Thus, hot acids under pressure are not effective in removing iron contamination without extracting lithia values at the same time, and magnetic separation, either wet or dry, has not proved effective in removing the lattice-bound iron. One improved approach involves heating the spodumene in a reducing, hydrogen-containing atmosphere until at least a major portion of the lattice-bound iron therein has been converted to elemental iron. The treated spodumene then is further treated as by acid leaching, to remove the reduced iron.

It has long been known that elemental iron will react with chlorine or hydrogen chloride to form a volatile iron chloride. Thus, the relatively free iron associated with sand and clay, for example, can be so reacted with chlorine of hydrogen chloride (U.S. Patents Nos. 1,824,807 and 2,182,384, British Patent No. 834,383 and German Patent No. 586,588).

It is the principal object of the present invention to provide a single-step process for removing lattice-bound iron from spodumene.

It is another object of the present invention to provide a novel process for reducing substantially the iron content of spodumene.

It is a further object of the present invention to provide a novel process for reducing substantially the iron content of spodumene without, at the same time, reducing significantly the lithia content thereof.

Other objects will become apparent from a consideration of the following specification and claims.

The present process comprises heating α-spodumene at a temperature of from about 1850 to about 2100° F. to convert it to β-spodumene and contacting the β-spodumene with at least one chlorinous gas selected from the group consisting of chlorine and hydrogen chloride at a temperature of from at least about 1750° to about 2100° F. until at least the major portion of the lattice-bound iron is removed.

The present process is a simple yet highly effective way to remove lattice-bound iron contamination from spodumene. This iron may be removed from the spodumene without significantly removing lithia values, and the process does not otherwise deleteriously affect the spodumene. Of importance is the fact that the present process may involve but a single step—treatment with chlorine or hydrogen chloride—and does not require a preliminary reduction treatment with hydrogen. This is surprising, in view of the prior art and the past difficulties in removing lattice-bound iron from spodumene. As a result of the present process, the iron content of commercial spodumene has been reduced to as low as about 0.04%. As will appear hereinafter, the extent of iron removal achieved in any particular case may depend upon various factors, such as temperature and time of treatment and extent of supplemental magnetic separation of free magnetic iron compounds. However, such factors can be controlled as necessitated by the degree of reduction in iron contamination desired. As stated previously reduction of iron contamination to below about 0.1% $Fe_2O_3$ is the preferred goal, at least to provide a product acceptable to the glass-making industry. Other applications may not require such a high degree of iron removal so that the present invention may find use in applications where it is desired to reduce the iron content to, say, about 0.3%.

Spodumene, which in its natural state is in the so-called alpha form, upon concentration by flotation contains in the neighborhood of 6.2% $Li_2O$ and 2.5% $Fe_2O_3$. This can be further refined by passing a slurry thereof through a permanent magnet which removes metallic iron and the more strongly magnetic free iron compounds, lowering the $Fe_2O_3$ content to the neighborhood of 1.5%, and, coincidentally, raising the $Li_2O$ content slightly, say to the neighborhood of 6.4%. This spodumene will be referred to hereinafter as "1.5% $Fe_2O_3$ grade" spodumene. Roughly two-thirds of the iron in this grade of spodumene is in the form of free iron-containing compounds or minerals (e.g. amphiboles, triphyllite and chlorite) which are somewhat magnetic and can be removed physically as by high intensity magnetic separation followed by screen removal of iron-rich fines. The resulting spodumene, referred to hereinafter as "ceramic grade" spodumene, has a $Fe_2O_3$ content in the neighborhood of 0.5–0.6%. Most of this iron, as distinguished from the free forms physically separable from the spodumene as discussed above, is a chemical part of the spodumene itself.

It is unreduced, cationic iron, being in a positive valence state, at least +2 and most likely +3. It is, as stated, in solid solution in the spodumene lattice, possibly taking the place of an aluminum atom in the alumino silicate crystal structure. It is this iron contamination that has presented the greatest difficulties, and it is to the removal of at least the major portion of this iron that the present invention is directed. It has been found that, in β-spodumene which has been converted from α- to β-form at a temperature of from about 1850 to about 2100° F., chlorine and hydrogen chloride will act directly on this lattice-bound iron, under certain temperature conditions, converting it to volatile iron chloride which passes out of the spodumene and into the gas atmosphere.

The spodumene should be finely-divided. Generally, it will be fine enough such that at least 90% thereof passes through a 4 mesh screen (U.S. Standard Series), preferably a 20 mesh screen.

In accordance with the present invention, β-spodumene which has been converted from α- to β-form at a temperature from about 1850 to about 2100° F., is contacted with chlorine and/or hydrogen chloride at a temperature of at least about 1750° F. and up to about 2100° F. A preferred temperature range for treatment with the chlorine or hydrogen chloride is from about 1850 to about 2000° F. At these temperatures, appreciable sintering of the spodumene grains does not take place. Temperatures down to about 1750° F. are suitable when the stated preconverted β-spodumene is the starting material. When α-spodumene is the starting material, the temperature should be at least about 1850° F., as stated, and preferably from about 1850 to about 2000° F. to insure proper conversion thereof to β-form in the presence of the treating gas. It will be seen from the foregoing that conversion of the spodumene from α- to β-form may take place prior to or during treatment with the chlorine and/or hydrogen chloride.

The time at which the sopdumene is maintained in contact with the treating gas at a temperature within these ranges does not appear to be critical and may well be determined by the nature of the equipment used. For example, in counter-current gas-solids contacting apparatus, the actual contact time may be a matter of seconds; in rotary kilns, it may be somewhat longer, and in batch, fixed bed operations, it may be even longer, as up to about an hour. In any event, substantially each individual spodumene particle will be contacted by the chlorine or hydrogen chloride. The time required in any particular case can be readily determined by analyzing samples from time to time.

Contact of the stated β-spodumene with the chlorine or hydrogen chloride causes conversion of lattice-bound iron to volatile iron chloride. In accordance with the present invention, the time-temperature conditions are generally selected to convert at least the major portion of the lattice-bound iron to iron chloride. The iron chloride, being volatile under the temperature conditions employed, passes off into the treating atmosphere which eventually becomes separated from the treated spodumene. The iron chloride may itself be separated from the atmosphere by selective condensations.

With respect to the chlorine and hydrogen chloride employed, this may be essentially the pure gas itself, that is, the treating atmosphere may be substantially 100% chlorine, 100% hydrogen chloride or composed entirely of a mixture of both. However, chlorine or hydrogen chloride need not displace all the air in the treating zone, and atmospheres much less concentrated in such gas may be used. Concentrations of chlorine and hydrogen chloride in air or other gas, like flue gas, down to about 5%, by volume, are possible depending upon the degree of reduction of iron content desired. Air containing from about 10 to about 50% chlorine, by volume, is the preferred chlorine-containing atmosphere. It will be noted that this treating atmosphere is actually oxidizing in the chemical sense so that no reduction of the iron can take place during treatment.

Reference has been made above to the magnetic separation of free iron and free magnetic iron compounds or minerals from spodumene. While it is not necessary that any of this magnetic material be removed magnetically, advantageously at least the more highly magnetic material is removed, as by wet separation using a premanent magnet, before treatment according to the present invention so that the starting material has an iron content no greater than about 1.5% (as $Fe_2O_3$). Preferably, even the less magnetic free iron compounds or minerals are also removed by wet or dry high-intensity, induced roll magnetic separation. Surprisingly, this high intensity magnetic separation is effective after treatment with chlorine or hydrogen chloride, although its greatest effect is prior to such treatment. In this latter case, the iron content of the spodumene starting material will be reduced to the neighborhood of 0.5–0.9% (as $Fe_2O_3$), depending upon the number of passes through magnetic separation, and the starting material is comparable to ceramic grade spodumene.

The invention will be more fully understood from the following examples which are given for the purpose of illustration and are not intended to limit the scope of the invention in any way.

Examples 1–23 illustrate the use of chlorine gas.

Example 1

Ceramic grade α-spodumene, 25 grams (about 90% through 200 mesh) is placed in a refractory fire clay combustion boat and placed inside a fused silica tube in an electrically heated furnace. The tube and its contents are heated to 1900° F. After a brief nitrogen purge, chlorine gas is admitted to the tube and flowed through the tube for one-half hour. The chlorine is then turned off, and the tube purged again with nitrogen. The original untreated spodumene has 7.04% $Li_2O$ and 0.63% $Fe_2O_3$ ($Li_2O/Fe_2O_3$ ratio of 11.2); the final treated spodumene has 6.51% $Li_2O$ and 0.06% $Fe_2O_3$ ($Li_2O/Fe_2O_3$ ratio of 108.5). About 90–95% of the α-spodumene is converted to β-spodumene during the treatment.

Example 2

The procedure of Example 1 is followed except that the α-spodumene has a particle size through 40 mesh, contains 6.73% $Li_2O$ and 0.71% $Fe_2O_3$ ($Li_2O/Fe_2O_3$ ratio of 9.5), and the temperature of chlorine treatment is 1950° F. The product contains 6.49% $Li_2O$ and 0.07% $Fe_2O_3$ ($Li_2O/Fe_2O_3$ ratio of 92.7). Over 95% of the α-spodumene is converted to beta form.

Example 3

The procedure of Example 1 is followed except that the spodumene is ceramic grade β-spodumene obtained by pre-calcining the α-spodumene of Example 1 in air at 2075° F., and the temperature of chlorine treatment is 1950° F. The product contains 6.78% $Li_2O$ and 0.07% $Fe_2O_3$ ($Li_2O/Fe_2O_3$ ratio of 96.9).

Example 4

The procedure of Example 3 is followed except that the temperature of chlorine treatment is 1750° F. The product contains 7.00 $Li_2O$ and 0.19% $Fe_2O_3$ ($Li_2O/Fe_2O_3$ ratio of 36.8).

Example 5

The procedure of Example 2 is followed except that the spodumene is ceramic grade β-spodumene obtained by pre-calcining the α-spodumene of Example 2 in air at 2075° F., and the temperature of chlorine treatment is 2000° F. The product contains 6.33% $Li_2O$ and 0.04% $Fe_2O_3$ ($Li_2O/Fe_2O_3$ ratio of 158.3).

Example 6

The procedure of Example 5 is followed except that the temperature of chlorine treatment is 1750° F. The product contains 6.63% $Li_2O$ and 0.16% $Fe_2O_3$ ($Li_2O/Fe_2O_3$ ratio of 41.4).

Example 7

The procedure of Example 1 is followed except that the spodumene is 1.5% $Fe_2O_3$ grade α-spodumene (21.8% +80 mesh, 29.5% −80+140 mesh, 36.3% −140+325 mesh 12.4% −325 mesh) containing 6.42% $Li_2O$ and 1.61% $Fe_2O_3$ ($Li_2O/Fe_2O_3$ ratio of 3.99), and the temperature of chlorine treatment is 2000° F. The product contains 5.56% $Li_2O$ and 0.13% $Fe_2O_3$ ($Li_2O/Fe_2O_3$ ratio of 42.8). Essentially all of the α-spodumene is converted to beta form.

Example 8

The procedure of Example 7 is followed except that the α-spodumene is preliminarily milled to where 65% passes a 325 mesh screen. The product contains 5.49% $Li_2O$ and 0.09% $Fe_2O_3$ ($Li_2O/Fe_2O_3$ ratio of 61).

Example 9

In this example is used 1.5% $Fe_2O_3$ grade α-spodumene (6.43% $Li_2O$ and 1.54% $Fe_2O_3$) having the particle size distribution: 18.1% +80 mesh, 33.8% −80+140 mesh, 19.8% −140+200 mesh, 17.8% −200+325 mesh and 10.5% −325 mesh. Seventy-five grams, held in an alumina boat, are placed in a fused silica tube (72" x 3") held in an electrically heated furnace. The tube and its contents are heated to 1950° F. Chlorine gas is then passed into and through the tube displacing the air, and the passage of chlorine through the tube is continued for 30 minutes at the rate of 1.36 ft.³/hr. The treated spodumene contains 6.05% $Li_2O$ and 0.35% $Fe_2O_3$. After being subjected to slight vibration to separate black specks of free iron compounds or minerals from the spodumene particles, the material is subjected to dry high intensity, induced roll magnetic separation (two passes) resulting in a non-magnetic fraction (amounting to 87.13% of the starting material) containing 6.18% $Li_2O$ and 0.10% $Fe_2O_3$.

Example 10

In this example, the spodumene as used in Example 9 is subjected to dry, high intensity, induced roll magnetic separation (one pass) and a sample is treated with chlorine under the same conditions as in Example 9. This product contains 6.43% $Li_2O$ and 0.12% $Fe_2O_3$. The remainder of the material from which the sample is taken is subjected to another pass of high intensity magnetic separation to provide a material containing 6.83% $Li_2O$ and 0.57% $Fe_2O_3$. This material is then subjected to chlorination under the same conditions as in Example 9 to provide a product containing 6.47% $Li_2O$ and 0.06% $Fe_2O_3$.

Examples 11–17

Spodumene as used in Example 9 is subjected to high intensity magnetic separation (two passes) to provide a material containing 6.73% $Li_2O$ and 0.64% $Fe_2O_3$. Samples of this material are then treated with chlorine as in Example 9 but for different times and at different temperatures as set forth in the following Table I along with the $Li_2O$ and $Fe_2O_3$ contents of the treated products.

TABLE I

| Example | Temp. (° F.) | Time (min.) | $Li_2O$ (percent) | $Fe_2O_3$ (percent) |
|---|---|---|---|---|
| 11 | 1,900 | 15 | 6.66 | 0.13 |
| 12 | 1,900 | 30 | 6.51 | 0.08 |
| 13 | 1,950 | 5 | 6.71 | 0.17 |
| 14 | 1,950 | 10 | 6.58 | 0.12 |
| 15 | 1,950 | 15 | 6.71 | 0.10 |
| 16 | 2,000 | 5 | 6.73 | 0.14 |
| 17 | 2,000 | 15 | 6.56 | 0.09 |

Examples 18–21

In these examples, the α-spodumene of Example 2 is calcined in air to β-spodumene at 2075° F. Twenty-five gram lots of this material are treated at 1950° F., with various mixtures of chlorine and air for various periods of time as set forth in the following Table II along with the $Li_2O$ and $Fe_2O_3$ contents of the treated products:

TABLE II

| Example | Chlorine (percent) | Air (percent) | Time (min.) | $Li_2O$ (percent) | $Fe_2O_3$ (percent) |
|---|---|---|---|---|---|
| 18 | 58 | 42 | 30 | 6.66 | 0.10 |
| 19 | 58 | 42 | 15 | 6.70 | 0.12 |
| 20 | 10 | 90 | 30 | 6.79 | 0.12 |
| 21 | 10 | 90 | 15 | 6.79 | 0.18 |

The following examples illustrate the use of hydrogen chloride.

Examples 22–33

Ceramic grade α-spodumene (20 x 140 mesh) is calcined for ½ hour at various temperatures set forth in the following Table III as the "Calc. Temp." Samples of the resulting β-spodumene, 4 grams each, are changed to an alumina combustion boat which is placed inside a fused silica tube in an electrically heated furnace. Hydrogen chloride (100%) is then passed through the tube at a flow rate of 1.36 ft.³/hr. for ½ hour at various temperatures set forth in the following Table III as "Treat. Temp." The original untreated spodumene has 6.91% $Li_2O$ and 0.55% $Fe_2O_3$ ($Li_2O/Fe_2O_3$ ratio of 12.4); and the final treated spodumene has values as set forth in Table III.

TABLE III

| Example | Calc. Temp. (° F.) | Treat. Temp. (° F.) | $Li_2O$ (percent) | $Fe_2O_3$ (percent) | $Li_2O/Fe_2O_3$ |
|---|---|---|---|---|---|
| 22 | 1,900 | 1,800 | 6.86 | 0.15 | 46 |
| 23 | 1,900 | 1,900 | 6.82 | 0.09 | 74 |
| 24 | 1,900 | 2,000 | 6.73 | 0.08 | 82 |
| 25 | 1,900 | 2,100 | 6.43 | 0.07 | 87 |
| 26 | 2,000 | 1,800 | 6.86 | 0.17 | 40 |
| 27 | 2,000 | 1,900 | 6.75 | 0.14 | 48 |
| 28 | 2,000 | 2,000 | 6.73 | 0.14 | 48 |
| 29 | 2,000 | 2,100 | 6.45 | 0.12 | 54 |
| 30 | 2,100 | 1,800 | 6.84 | 0.24 | 29 |
| 31 | 2,100 | 1,900 | 6.78 | 0.20 | 34 |
| 32 | 2,100 | 2,000 | 6.73 | 0.15 | 45 |
| 33 | 2,100 | 2,100 | 6.50 | 0.14 | 46 |

Examples 34–38

Samples of α-spodumene as used in Examples 22–23, but which has not been converted to β-spodumene, are treated with hydrogen chloride as in Examples 22–23 at various temperatures with the results set forth in the following Table IV.

TABLE IV

| Example | Treat. Temp. (° F.) | $Li_2O$ (percent) | $Fe_2O_3$ (percent) | $Li_2O/Fe_2O_3$ |
|---|---|---|---|---|
| 34 | 1,800 | 7.06 | 0.32 | 22 |
| 35 | 1,900 | 6.77 | 0.07 | 101 |
| 36 | 2,000 | 6.80 | 0.08 | 88 |
| 37 | 2,100 | 6.53 | 0.10 | 63 |
| 38 | 2,200 | 5.56 | 0.14 | 40 |

The product of Example 34 is only about 10% converted to β form; that of Example 35 is about 85–90% converted, and those of Examples 36–38 are essentially completely converted.

Examples 39–41

Alpha-spodumene as used in Examples 22–28 is calcined at 1900° F. for ½ hour converting 85–90% thereof to β form. Samples of the calcined material are then treated with mixtures of hydrogen chloride and carbon dioxide, as set forth in the following Table V, at 2000° F. for ½ hour and at a total flow rate of 5 ft.³/hr. The results are as follows:

TABLE V

| Example | HCl (percent) | CO₂ (percent) | Li₂O (percent) | Fe₂O₃ (percent) | Li₂O/ Fe₂O₃ |
|---------|---------------|---------------|----------------|-----------------|-------------|
| 39 | 25 | 75 | 6.73 | 0.23 | 29 |
| 40 | 50 | 50 | 6.71 | 0.11 | 61 |
| 41 | 75 | 25 | 6.68 | 0.06 | 111 |

Modification is possible in the selection of operating techniques and conditions without departing from the scope of the invention.

Examples 42–54

Samples of ceramic grade spodumene (6.90% $Li_2O$; 0.55% $Fe_2O_3$), previously calcined at 1900° F. for 1 hour, are subjected to various gases and gas mixtures at 1900° F. in a 1″ I.D. mullite tube in a closed system. The gas flow is 1.5 ft.³/hr. The values of the treated spodumene are set forth in Table VI:

TABLE VI

| Example | Gas Mixture | 1,900° F. | |
|---------|-------------|-----------|---|
| | | Li₂O | Fe₂O₃ |
| 42 | 1 CO₂, 4 HCl | 5.84 | 0.029 |
| 43 | 1 CO, 4 HCl | 5.84 | 0.028 |
| 44 | 1 CO₂, 4 HCl, 5 Cl₂ | 6.23 | 0.031 |
| 45 | 1 CO, 4 HCl, 5 Cl₂ | 5.59 | 0.054 |
| 46 | 3 CO₂, 8 HCl | 5.96 | 0.029 |
| 47 | 3 CO, 8 HCl | 5.86 | 0.026 |
| 48 | 3 CO₂, 8 HCl, 11 Cl₂ | 6.02 | 0.034 |
| 49 | 3 CO, 8 HCl, 11 Cl₂ | 5.45 | 0.049 |
| 50 | 1 Cl₂ | 6.43 | 0.051 |
| 51 | 1 HCl | 5.78 | 0.030 |
| 52 | 3 CO₂, 1 Cl₂ | 6.67 | 0.051 |
| 53 | 1 CO, 1 Cl₂ | 6.29 | 0.087 |
| 54 | 1 CO₂, 1 Cl₂ | 6.50 | 0.050 |

The gas mixtures were selected as being typical mixtures obtained on burning a hydrocarbon or carbon (e.g. coke) in the presence of chlorine and various proportions of oxygen.

What is claimed is:

1. The process for removing lattice-bound iron from spodumene which comprises heating α-spodumene at a temperature from about 1850 to about 2100° F. to convert it to β-spodumene and contacting the β-spodumene with at least one chlorinous gas selected from the group consisting of chlorine and hydrogen chloride at a temperature of from at least about 1750 to about 2100° F. until at least the major portion of the lattice-bound iron is removed.

2. The process of claim 1 wherein the β-spodumene is contacted with said gas until the lattice-bound iron content is reduced to below about 0.3% (as $Fe_2O_3$).

3. The process of claim 2 wherein the β-spodumene is contacted with said gas until the lattice-bound iron content is reduced to no more than about 0.1% (as $Fe_2O_3$).

4. The process for removing lattice-bound iron from spodumene which comprises heating α-spodumene at a temperature from about 1850° F. to about 2100° F. to convert it to β-spodumene and contacting the β-spodumene with chlorine gas at a temperature of from at least about 1750 to about 2100° F. until at least the major portion of the lattice-bound iron is removed.

5. The process of claim 4 wherein the β-spodumene is contacted with the chlorine until the lattice-bound iron content is reduced to below about 0.3% (as $Fe_2O_3$).

6. The process of claim 5 wherein the β-spodumene is contacted with the chlorine until the lattice-bound iron content is reduced to no more than about 0.1% (as $Fe_2O_3$).

7. The process of claim 4 wherein said spodumene contains free magnetic iron compounds and wherein at least a substantial portion of these is removed magnetically prior to contact with said chlorine.

8. The process of claim 4 wherein said β-spodumene, following said contact with chlorine and removal of lattice-bound iron, contains free magnetic iron compounds and wherein at least a substantial portion of these is removed magnetically.

9. The process of claim 4 wherein said β-spodumene is contacted with said chlorine gas at a temperature of from about 1850 to about 2000° F.

10. The process of claim 1 wherein said gas is hydrogen chloride.

11. The process of claim 2 wherein said gas is hydrogen chloride.

12. The process of claim 3 wherein said gas is hydrogen chloride.

13. The process of claim 10 wherein said spodumene contains free magnetic iron compounds and wherein at least a substantial portion of these is removed magnetically prior to contact with said hydrogen chloride.

14. The process of claim 10 wherein said β-spodumene, following said contact with hydrogen chloride and removal of lattice-bound iron, contains free magnetic iron compounds and wherein at least a substantial portion of these is removed magnetically.

References Cited

UNITED STATES PATENTS

| 1,824,807 | 9/1931 | English | 23—110 X |
| 2,182,384 | 12/1939 | McGregor | 23—182 X |

FOREIGN PATENTS 834,383  5/1960  Great Britain.

OSCAR R. VERTIZ, Primary Examiner.
A. GRIEF, Assistant Examiner.